United States Patent
Vasipalli et al.

(10) Patent No.: US 11,803,227 B2
(45) Date of Patent: Oct. 31, 2023

(54) PROVIDING UTILIZATION AND COST INSIGHT OF HOST SERVERS

(71) Applicant: HEWLETT PACKARD ENTERPRISE DEVELOPMENT LP, Houston, TX (US)

(72) Inventors: Saikrishna Reddy Vasipalli, Karnataka (IN); Murthy Prabhu, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 251 days.

(21) Appl. No.: 16/276,729

(22) Filed: Feb. 15, 2019

(65) Prior Publication Data
US 2020/0264690 A1    Aug. 20, 2020

(51) Int. Cl.
G06F 1/3287    (2019.01)
G06F 1/3206    (2019.01)
G06F 11/30    (2006.01)
H02J 3/16    (2006.01)
G06Q 50/06    (2012.01)
H02J 3/00    (2006.01)

(52) U.S. Cl.
CPC .......... *G06F 1/3287* (2013.01); *G06F 1/3206* (2013.01); *G06F 11/3062* (2013.01); *H02J 3/16* (2013.01); *G06Q 50/06* (2013.01); *H02J 3/003* (2020.01)

(58) Field of Classification Search
CPC .. G06F 1/3287; G06F 1/3206; G06F 11/3062; H02J 3/16; G06Q 50/06
See application file for complete search history.

(56) References Cited

U.S. PATENT DOCUMENTS

| 8,374,928 B2 | 2/2013 | Gopisetty et al. |
| 9,672,068 B2 | 6/2017 | Gaurav et al. |

(Continued)

FOREIGN PATENT DOCUMENTS

CN    108009120    5/2018

OTHER PUBLICATIONS

Kin Lane, "Unified APIs or API standards, The Race is On," May 2, 2011, ProgrammableWeb. (Year: 2011).*

(Continued)

*Primary Examiner* — Ji H Bae
*Assistant Examiner* — Hyun Soo Kim
(74) *Attorney, Agent, or Firm* — Mauriel Kapouytian Woods LLP

(57) ABSTRACT

Respective energy consumption data is collected via respective agents running on respective host servers. The respective energy consumption data represents energy consumed by the respective host servers over a time period. The respective agents communicate with hardware on each of the respective host servers using a unified application programming interface (API). Respective energy costs are determined over the time period for the respective host servers based on the respective energy consumption data. A subset of the respective host servers that are being underutilized is identified based on the respective energy consumption data and the respective energy costs. An action to take with respect to the subset of the respective host servers that are being underutilized is determined to reduce the energy costs.

20 Claims, 6 Drawing Sheets

(56) References Cited

U.S. PATENT DOCUMENTS

| | | | | |
|---|---|---|---|---|
| 2003/0176952 | A1* | 9/2003 | Collins | H04L 67/12 |
| | | | | 700/286 |
| 2009/0119233 | A1* | 5/2009 | Dunagan | G06Q 10/04 |
| | | | | 705/412 |
| 2011/0208622 | A1* | 8/2011 | Gopisetty | G06Q 10/067 |
| | | | | 705/30 |
| 2012/0030356 | A1* | 2/2012 | Fletcher | G06F 9/5094 |
| | | | | 709/226 |
| 2012/0166143 | A1* | 6/2012 | Brown | G06F 11/3062 |
| | | | | 702/188 |
| 2015/0033319 | A1* | 1/2015 | Roberts | H04W 12/03 |
| | | | | 726/11 |
| 2016/0091948 | A1* | 3/2016 | Mitchell | G06F 1/3206 |
| | | | | 713/340 |
| 2016/0379237 | A1 | 12/2016 | Shapsa et al. | |
| 2017/0139462 | A1* | 5/2017 | Potlapally | G06F 11/3062 |
| 2020/0349484 | A1* | 11/2020 | Serven | G06N 3/08 |
| 2021/0042140 | A1* | 2/2021 | Paul | G06F 1/324 |

OTHER PUBLICATIONS

Basmadjian R. et al.; "Cloud Computing and Its Interest in Saving Energy: The Use Case of a Private Cloud"; Dec. 2012; 25 pages.
Kaur, H. et al.; "A Survey on the Power and Energy Consumption of Cloud Computing"; May-Jun. 2015; 4 pages.
DNSstuff, "Top Free Server Monitoring Tools", SolarWinds Worldwide, LLC, available online at <https://www.dnsstuff.com/free-server-monitoring-tools>, Feb. 4, 2019, 18 pages.
HPE, "HPE Performance Cluster Manager", Dec. 3, 2018, 10 pages.

* cited by examiner

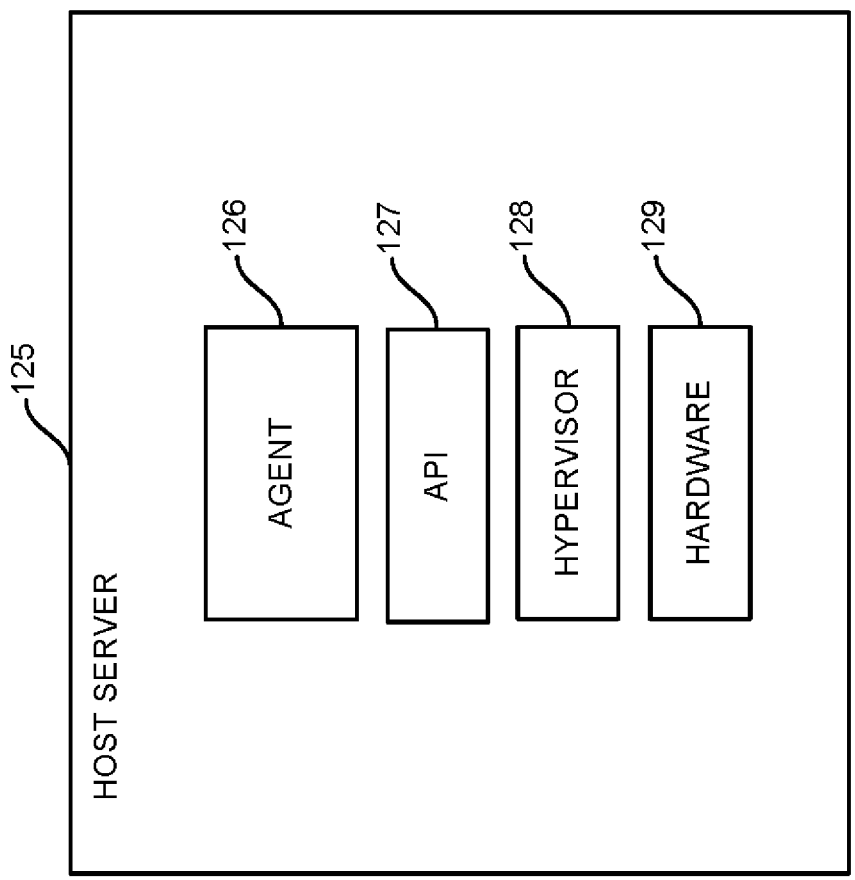

| Power Capacity per Host | AveragePower | CpuUtilization | PeakPower | NetworkUtilization | | | Power consumption Cost |
|---|---|---|---|---|---|---|---|
| | | | | vmnic0 | vmnic1 | vmnic2 | |
| Host1-189 | 100 | 47% | 142 | 60 | 0 | 140 | $ 23.00 |
| Host2-135 | 61 | 30% | 121 | 0 | 10 | 80 | $ 14.00 |
| Host3-180 | 71 | 0% | 144 | 0 | 0 | 3 | $ 16.00 |
| Host4-198 | 62 | 0% | 96 | 0 | 0 | 4 | $ 14.00 |
| Host5-287 | 66 | 30% | 141 | 30 | 20 | 75 | $ 15.00 |
| Host6-206 | 80 | 0% | 106 | 0 | 0 | 2 | $ 19.00 |
| Host7-191 | 59 | 0% | 83 | 0 | 0 | 1 | $ 14.00 |
| Host8-200 | 94 | 80% | 106 | 15 | 0 | 108 | $ 22.00 |
| Host9-310 | 92 | 10% | 119 | 0 | 25 | 4 | $ 21.00 |

FIG. 5

PROVIDING UTILIZATION AND COST INSIGHT OF HOST SERVERS

BACKGROUND

In a cloud computing environment, host servers provide data storage and computational resources. The host servers include hardware that consumes power. Additionally, resources used for cooling the host servers consume power.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 1B conceptually illustrates details of a host server, according to one or more examples of the disclosure.

FIG. 5 is a table depicting energy consumption data and energy cost data for host servers, according to one or more examples of the disclosure.

DETAILED DESCRIPTION

Figure 1A:
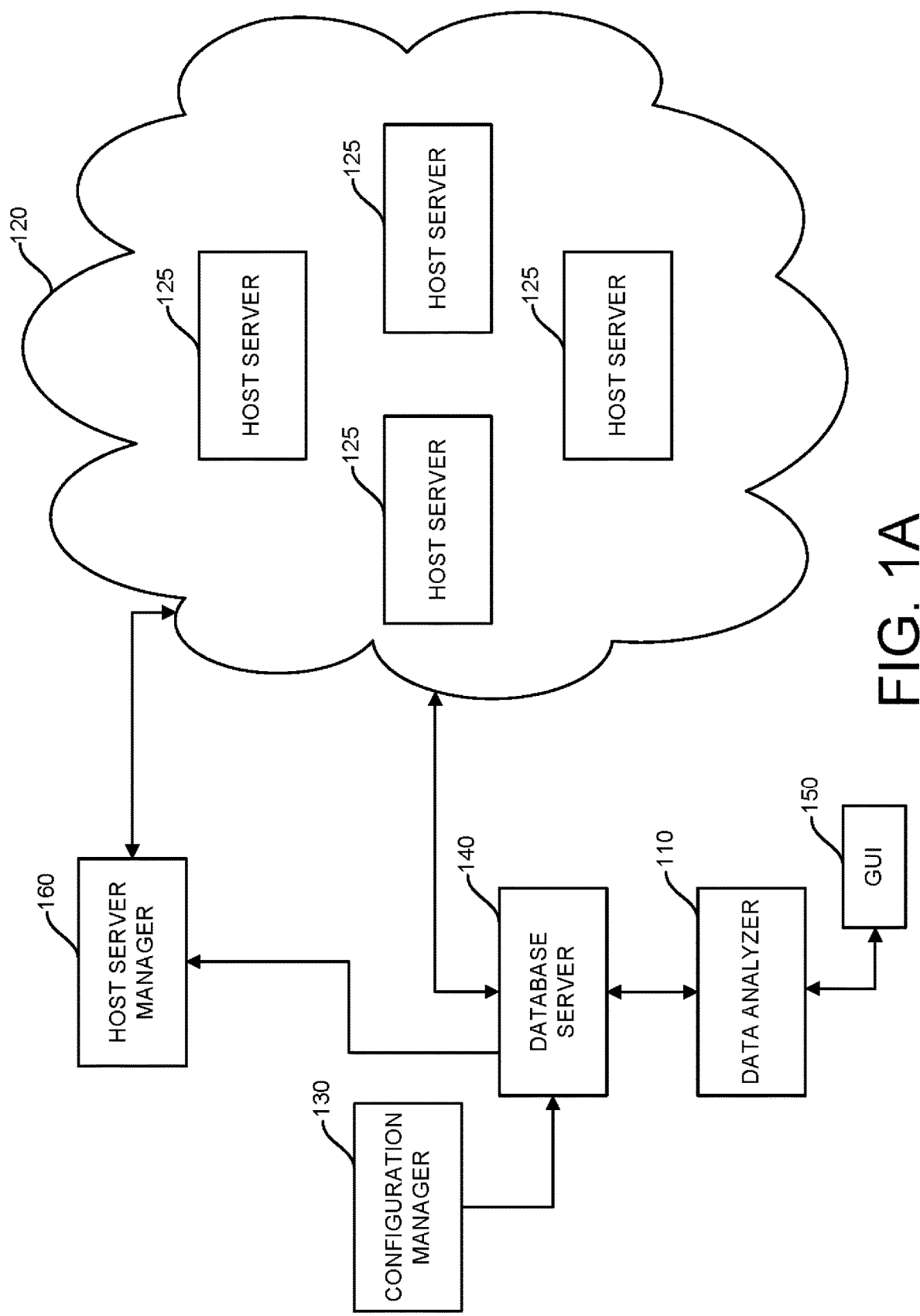
FIG. 1A conceptually illustrates a system including a data analyzer for determining an action to take to reduce energy consumption of host servers in a cloud computing environment, according to one or more examples of the disclosure.

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

A cloud computing environment includes host servers that provide data storage and computational bandwidth. A host server can refer to a computing device including a processor that performs operations to provide an application or a service.

Cloud computing environments include public cloud computing environments and private cloud computing environments. Public cloud computing environments include host servers providing storage and computational resources via a public communications network, such as the Internet. By contrast, private cloud computing environments include host servers in a server farm or data canter which provide storage and computational resource via a private network, such as a company's Intranet.

The host servers in both public cloud computing environments and private cloud computing environments include hardware that consume energy. Additionally, resources used for cooling the host servers consume energy.

In a public cloud computing environment, energy consumption costs for any given server is not of particular concern, as energy consumption costs are distributed across tens of thousands of host servers at any given time. Also, the frequent allocation and deallocation of servers in a public cloud computing environment tends to compensate for fluctuations in energy consumption for any given host server.

On the other hand, private cloud computing environments have a much smaller number of host servers, and energy consumption is likely to vary a lot between the host servers depending on the time of day, day of the week, etc. Therefore, host servers in a private cloud computing environment suffer more from load variations, and the energy consumption costs of host servers is of great concern to the company providing the host servers.

Techniques have been proposed for monitoring the energy consumption of host servers in a private cloud computing environment and optimizing the configuration of the host servers to reduce energy consumption. However, such techniques are not applicable to host servers manufactured by different vendors. Further, such techniques are not capable of providing energy cost data or proactively alerting users that host servers are being underutilized.

In accordance with illustrative examples, insight into utilization of host servers and energy costs due to energy consumption of the host servers in a cloud computing environment, such as a private cloud computing environment, is provided. Energy consumption and energy costs of the host servers are tracked such that underutilized host servers may be identified, regardless of the manufacturer of the host servers, such that actions may be taken to reduce energy costs.

According to illustrative examples, respective energy consumption data is collected via respective agents running on the respective host servers. The respective energy consumption data represents energy consumed by the respective host servers over a time period. The respective agents communicate with hardware on each of the respective host servers using a unified application programming interface (API). Respective energy costs are determined over the time period for the respective host servers based on the respective energy consumption data. A subset of the respective host servers that are being underutilized is identified based on the respective energy consumption data and the respective energy costs. An action to take with respect to the subset of the respective host servers that are being underutilized is determined to reduce the energy costs. A description of the action and/or an alert regarding the underutilized servers may be provided to a user, and the action may be initiated either automatically or in response to user input.

FIG. 1A conceptually illustrates a system including a data analyzer 110 for determining an action to take to reduce energy consumption of host servers 125 in a cloud computing environment 120, according to one or more examples of the disclosure. According to one example, the cloud computing environment 120 may be a private cloud computing environment. The host servers 125 may be included in a data center or server farm within the cloud computing environment 120.

The data analyzer 110 determines an action to take to reduce energy consumption based on energy consumption data collected from the host servers 125. In a private cloud computing environment, access to the host servers 125 is restricted through the use of usernames and passwords. Accordingly, to access the host servers 125 to collect energy consumption data, a list of the host servers 125 to be monitored for energy consumption is provided to a configuration manager 130, along with the usernames and passwords associated with the servers to be monitored. The list of host servers 125 to be monitored and their associated usernames and passwords may be provided to the configuration manager 130 by an administrator (not shown).

The configuration manager 130 provides the list of host servers 125 to be monitored and their associated usernames and passwords to a database server 140. The database server 140 stores the list of host servers 125 and their associated usernames and passwords and instructs respective agents 126 (shown in FIG. 1B) running on the respective host servers 125 to collect respective energy consumption data representing energy consumed by the respective host servers 125 over a time period, e.g., a month. The energy consumption data may include power consumption data representing power consumed by the hardware of the respective host servers 125 and cooling consumption data representing energy consumed in cooling the respective host servers 125.

Examples of hardware in the respective host servers 125 that consume power may include a central processing unit (CPU), memory, etc. Examples of resources that consume energy in cooling the respective host servers include fans, water coolers, etc. These resources may be considered to be part of the hardware of the respective host servers 125 or may be in communication with the hardware of the respective host servers 125. In addition to monitoring energy consumed by the hardware of the respective servers, energy consumed due to network unitization of the host servers 125 may be monitored.

FIG. 1B depicts details of a host server 125 according to one example. As shown in FIG. 1B, an agent 126 running on the host server 125 communicates with hardware 129 via a unified application programming interface (API) 127 and the hypervisor 128. The API 127 is unified in the sense that it allows communication between the agent 126 and the hardware 129 across all manufacturers of host servers 125. Thus, the respective agent 126 running in each respective host server 125 is able to communicate with the hardware 129 of the respective host server 125, regardless of the manufacturer of the respective host server 125. In one example, an open service broker may also be used as the unified API.

Referring again to FIG. 1A with continued reference to FIG. 1B, the data analyzer 110 collects the energy consumption data via the respective agents 126 running on the respective host servers 125. In one example, the energy consumption data collected via the respective against 126 may be stored temporarily in the database server 140 and delivered to the data analyzer 110 for the time period. The data analyzer 110 determines respective energy costs over the time period for the respective host servers 125 based on the respective energy consumption data.

Figure 4:
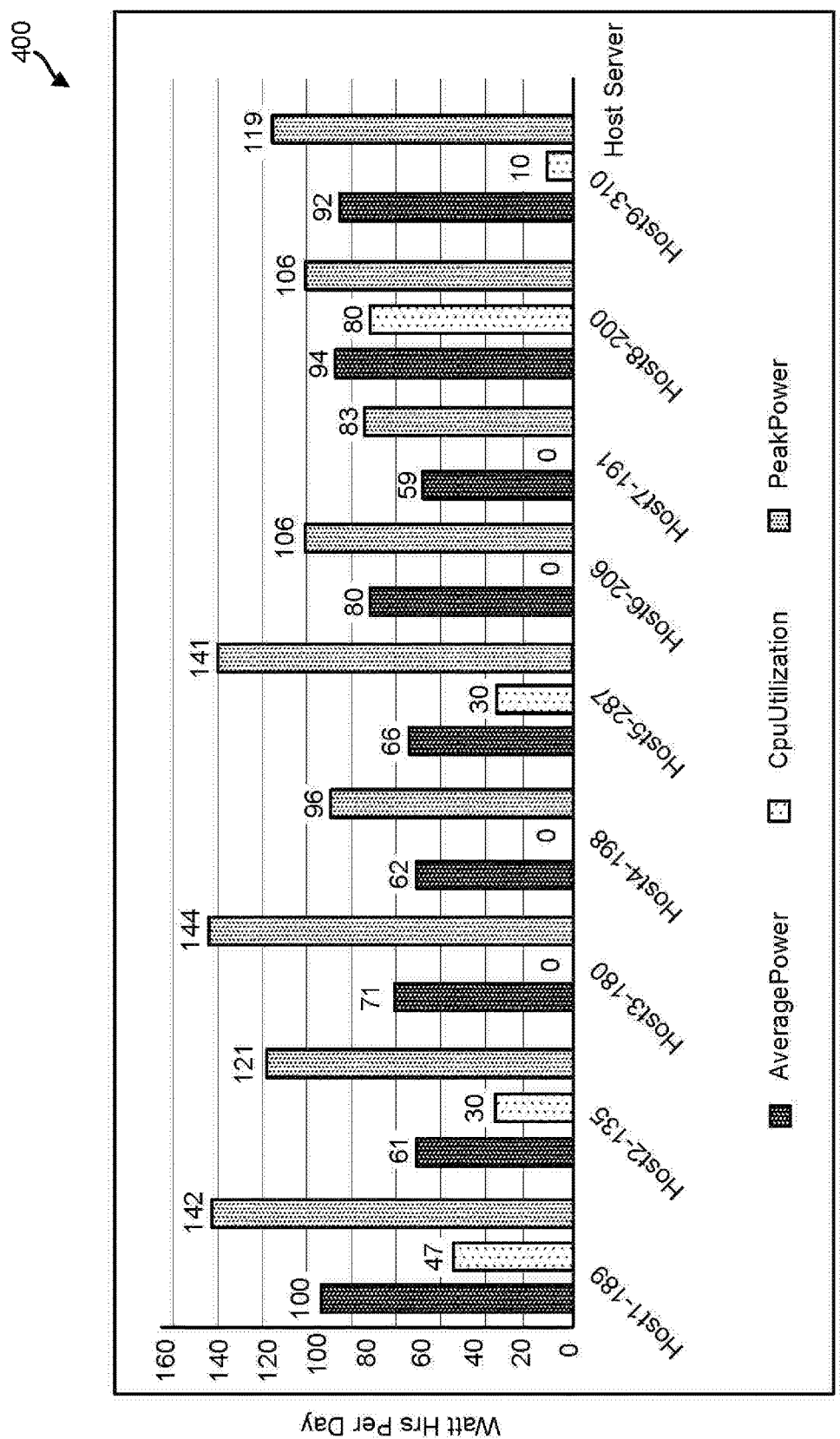
FIG. 4 is a graph depicting energy consumption data for host servers, according to one or more examples of the disclosure.

The data analyzer 110 may determine the respective energy costs using predefined costs per energy unit data that may be stored in the data analyzer 110. As an example, assume that the data analyzer 110 has stored a predefined cost of $0.33 per kilowatt hour of energy consumed. Then assume that a host server 125 consumes on average 80 watt-hours per day. The data analyzer 110 may calculate the energy costs of a host server 125 over a month as follows:

80 watt-hours per hour*24=1920 watt-hours per day 1920 watt-hours per day/1000=1.92 kWh per day 1.92 watt-hours per day×30 days=57.6 kWh per month 57.6 kWh per month×$0.33 per kWh=$19 per month The data analyzer 110 identifies a subset of the respective host servers 125 that are being underutilized based on the respective energy consumption data and the respective energy costs. The data analyzer 110 may present the respective energy consumption data and respective energy cost data representing the respective energy costs for display to users via, for example, a graphical user interface (GUI) 150. Examples of displayed energy consumption data and energy cost data are illustrated in FIGS. 4 and 5, as described in more detail below.

The data analyzer 110 determines an action to take with respect to the subset of the respective host servers 125 that are being underutilized to reduce the energy costs. Examples of such actions may include: migrate the workload of an underutilized host server 125 to another host server 125; put an underutilized host server 125 into a power saving mode, such as off; and put an underutilized host server 125 into a hibernation or sleep mode for a limited amount of time, e.g., a weekend, etc. In one example, the data analyzer 110 may initiate the action automatically. In another example, the data analyzer 110 may present a description of the action to one or more users via the GUI 150 and initiate the action responsive to feedback from a user.

In addition to or instead of initiating the action, the data analyzer 110 may present an alert identifying the subset of the host servers 125 that are being underutilized to one or more users. In one example, the alert may be presented via GUI 150. In addition, or as an alternative, the alert may be sent as an electronic mail message, a short message service (SMS) message, etc. via a transceiver (not shown) connected to the data analyzer 110.

The data analyzer 110 may also forecast future energy consumption and future energy costs for each of the respective host servers 125 based on the respective energy consumption data and the respective energy costs. The data analyzer 110 may also forecast host servers 125 needed to handle an expected future workload and the expected energy costs of such host servers 125. For example, if workload is expected to increase, the data analyzer 110 may determine whether host servers 125 need to be added (e.g., by provisioning new host servers 125, powering up powered off host servers 125, or taking host servers 125 out of hibernation). The data analyzer 110 may also determine the expected energy costs for adding those host servers 125. Forecasted energy consumption data and energy cost data for the respective host servers 125 and any host servers that need to be added may be presented to one or more users via the GUI 150. This forecasting may be useful, for example, to allow a user to proactively plan to budget for future host server usage based on the current energy consumption data and the current energy cost data.

Whether the data analyzer 110 initiates an action to reduce energy consumption automatically or in response to user feedback, the data analyzer 110 initiates the action by instructing a host server manager 160 to take the action. The host server manager 160 controls provisioning of the host servers 125, migrating of workloads between the host servers 125, hibernation of the host servers 125, powering the host servers 125 on and off, etc. In response to instructions from the data analyzer 110, the host server manager 160 takes the action determined to reduce energy consumption costs.

The data analyzer 110, the configuration manager 130, the database server 140, and the host server manager 160 may be implemented with a computing device including a processor and a memory, such as the computing device 300 shown in FIG. 3 and described in more detail below.

In the example shown in FIG. 1A, the data analyzer 110, the configuration manager 130, the database server 140, the GUI 150, and the host server manager 160 communicate with each other via any suitable wired or wireless connection. The database server 140 and the host server manager 160 communicate with the host servers 125 in the cloud computing environment 130 via a private network, such as the Intranet.

Figure 2:
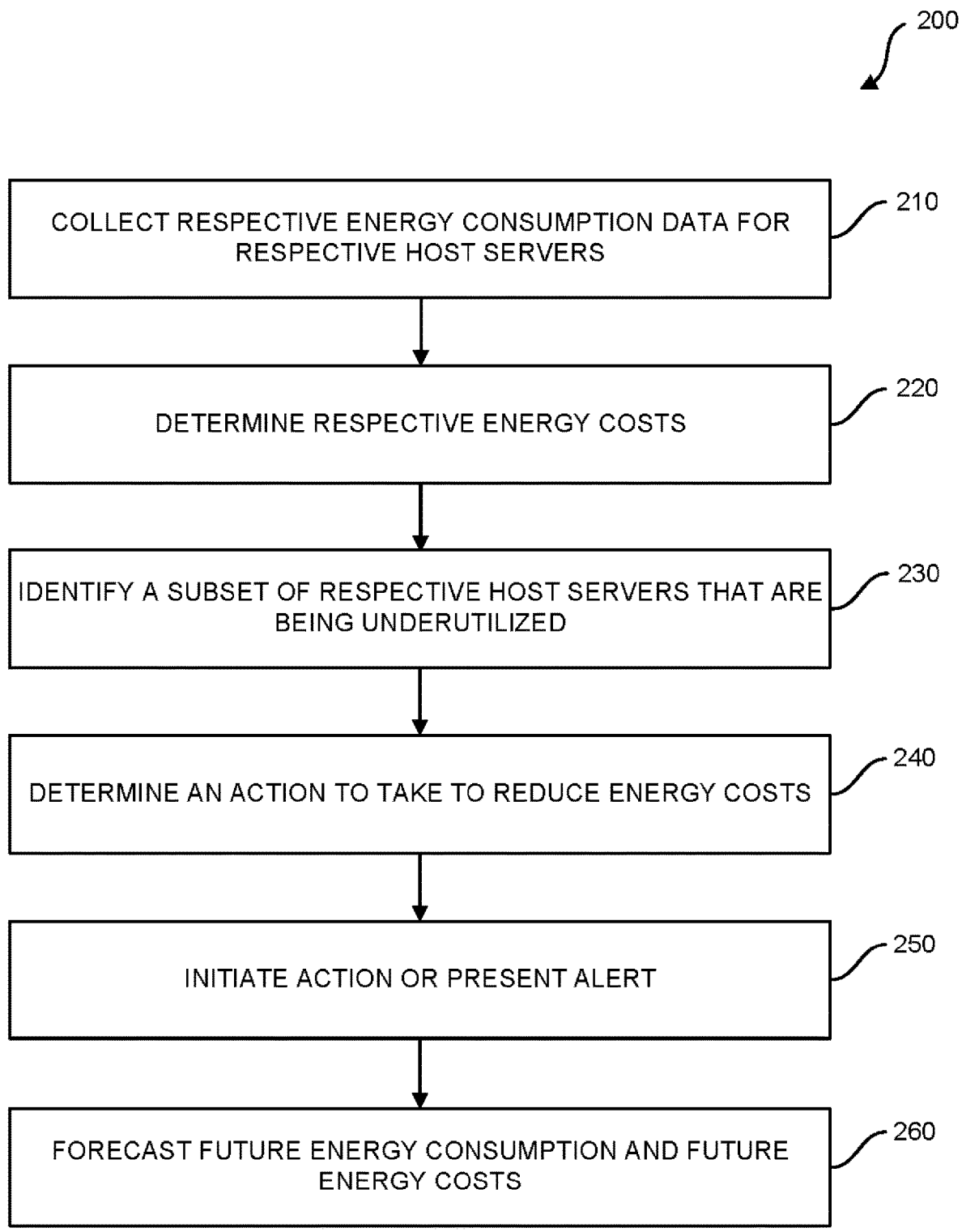
FIG. 2 is a flowchart depicting a method for determining an action to take to reduce energy consumption of host servers in a cloud computing environment, according to one or more examples of the disclosure.

FIG. 2 is a flowchart depicting a method 200 for determining an action to take to reduce energy consumption of host servers in a cloud computing environment according to one or more examples of the disclosure. The method may be performed by, for example, the data analyzer 110 shown in FIG. 1. The method 200 includes collecting respective energy consumption data at 210. Respective energy consumption data may be collected over repeating time periods, such as every month. The respective energy consumption data represents energy consumed by respective host servers in a cloud computing environment over a time period. The energy consumption data is collected via respective agents running on the respective host servers in a cloud computing environment. The respective agents communicate with hardware on each of the respective host servers using a unified application programming interface (API).

For each time period, respective energy costs for the respective host servers are determined at 220. A subset of the respective host servers that are being underutilized is identified at 230 based on the respective energy consumption data and the respective energy costs. An action to take with respect to the subset of the respective host servers that are being underutilized to reduce the energy costs is determined at 240. At 250, the action is initiated or an alert is presented identifying the subset of the respective host servers that are being underutilized. The action may be initiated automatically or in response to input from a user. In some instances, the action may be initiated and the alert may be presented.

Future energy consumption and future energy costs may be forecasted at 260 based on the respective energy consumption data and the respective energy costs. This forecasting may be done for an expected future workload at any time after the respective energy consumption data is collected and the respective energy costs are determined. As noted above, the forecasted future energy consumption and future energy costs may be presented to a user via, for example, the GUI 150 shown in FIG. 1.

Figure 3:
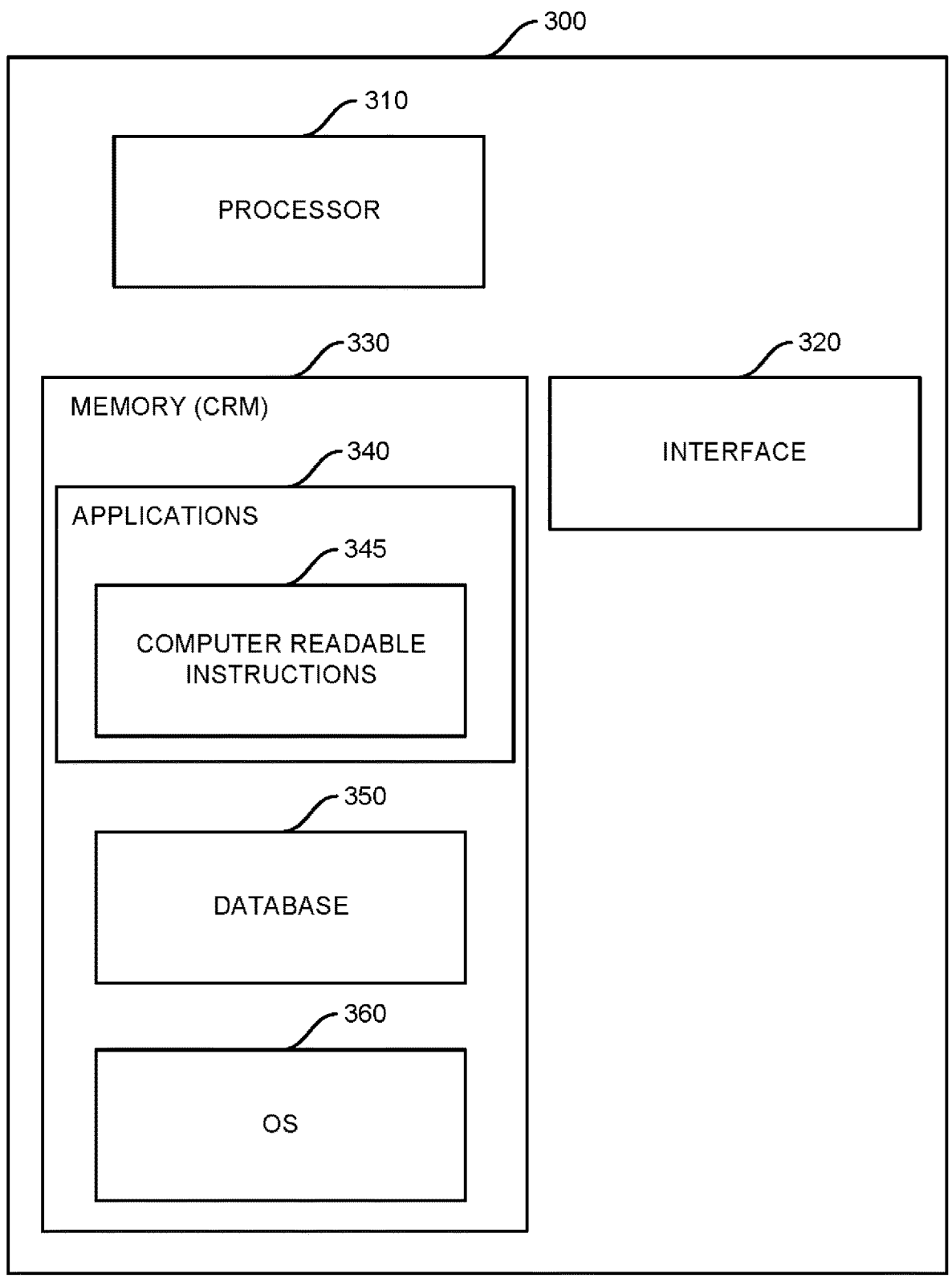
FIG. 3 conceptually illustrates details of a computing device with which the data analyzer shown in FIG. 1 may be implemented, according to one or more examples of the disclosure.

FIG. 3 is a block diagram of a computing device 300 with which the data analyzer 110 may be implemented, according to illustrative examples. The configuration manager, 130, the database server, 140 and the host server manager 160 may also be implemented with a computing device, such as the computing device 100 shown in FIG. 3. Although no connections are shown between the components illustrated in FIG. 3, those skilled in the art will appreciate that the components can interact with each other via any suitable connections to carry out device functions.

The term "application", or variants thereof, is used expansively herein to include routines, program modules, program, components, data structures, algorithms, and the like. Applications can be implemented on various system configurations, including single-processor or multiprocessor systems, minicomputers, mainframe computers, personal computers, microprocessor-based, programmable consumer electronics, combinations thereof, and the like. The terminology "computer-readable medium" and variants thereof, as used in the specification and claims, includes non-transitory storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed.

Referring to FIG. 3 with continued reference to FIG. 1, the computing device 300 includes a processor 310 that receives inputs and transmits outputs via an interface 320. The interface 320 can be implemented with, e.g., any suitable interface through which data and signals may be received and transmitted wired and/or wirelessly. For example, for the data analyzer 110, the inputs may include collected energy consumption data and feedback from users, and the outputs may include instructions to take actions to reduce energy costs, descriptions of the actions, alerts identifying the subset of underutilized servers, energy consumption data, energy cost data, etc.

Although not shown, the computing device 300 may also include a physical hard drive. The processor 310 communicates with memory 330 and the hard drive via, e.g., an address/data bus (not shown). The processor 310 can be any commercially available or custom microprocessor. The memory 330 is representative of the overall hierarchy of memory devices containing the software and data used to implement the functionality of the computing device 300. The memory 330 can include, but is not limited to, the types of memory devices described above, including a non-transitory computer readable medium (CRM). As shown in FIG. 3, the memory 330 may include several categories of software and data used in the computing device 300, including applications 340, a database 350, an operating system (OS) 360, etc.

The applications 340 can be stored in the memory 330 and/or in a firmware (not shown) and can include computer readable instructions 345 that can be executed by the processor 310. The applications 340 include various programs that implement the various features of the device 300. For example, the applications 340 may include applications to implement the functions of the data analyzer 110 (including collecting respective energy consumption data, determining respective energy costs, identifying a subset of the respective host servers that are being underutilized, determining an action to take with respect to the subset of the respective host servers that are being underutilized to reduce the energy costs, initiating the action and/or presenting an alert identifying the subset of the respective host servers that are being underutilized, etc.).

The database 350 represents the static and dynamic data used by the applications 340, the OS 360, and other software programs that may reside in the memory. The database 350 may be used to store various data including data needed to execute the applications 340, e.g., the collected energy consumption data, predefined cost data per unit of energy, a list of actions to take to reduce energy costs, etc.

While the memory 330 is illustrated as residing proximate the processor 310, it should be understood that at least a portion of the memory 330 can be a remotely accessed storage system, for example, a server on a communication network, a remote hard disk drive, a removable storage medium, combinations thereof, and the like.

It should be understood that FIG. 3 and description above are intended to provide a brief, general description of a suitable environment in which the various aspects of some examples of the present disclosure can be implemented. While the description includes a general context of computer-executable instructions, the present disclosure can also be implemented in combination with other program modules and/or as a combination of hardware and software in addition to, or instead of, computer readable instructions. For example, the data analyzer 110 could be implemented in whole or in part on specialized hardware, for example in a field-programmable gate array in order to achieve faster computation times.

As noted above, energy consumption data and energy cost data may be presented to one or more users via the GUI 150 shown in FIG. 1A. According to illustrative examples, the energy consumption data and energy cost data may be presented in graph form as shown in FIG. 4 or in table form as shown in FIG. 5.

Referring to FIG. 4, a graph 400 shows an example of energy consumption data for host servers. The graph 400 shows average power consumption, central processing unit (CPU) power consumption, and peak power consumption in watt-hours per day for nine host servers identified as: Host1-189, Host2-135, Host3-180, Host4-198, Host5-287, Host6-206, Host7-191, Host8-200, and Host9-310. As can be seen from the graph 400, Host3-180, Host4-198, Host 6-206, and Host7-191 are consuming 0 watt-hours per day for CPU utilization. From this graph, a user may determine that host servers Host3-180, Host4-198, Host6-206, and Host7-191 are being underutilized.

Referring to FIG. 5, a table 500 shows an example of energy consumption and energy costs of host servers, according to one or more examples of the disclosure. The table 500 shows average power consumption, CPU power consumption, peak power, power consumed by network utilization and power consumption costs for nine host servers identified as: Host1-189, Host2-135, Host3-180, Host4-198, Host5-287, Host6-206, Host7-191, Host8-200, and Host9-310. As shown in FIG. 5, Host 3-180, Host 4-198, Host6-206, and Host7-191 are consuming 0 watt-hours per day for CPU utilization. Additionally, these host servers are consuming very little power for network utilization. A user may be able to tell based on this information that host servers Host3-180, Host4-198, Host6-206, and Host7-191 are being underutilized.

Additionally, as indicated by the shading of the information for the various host servers in the table 500, the information corresponding to the host servers being underutilized may be highlighted as an alert to a user identifying these host servers as being underutilized. For example, the information for Host3-180, Host4-198, Host6-206, and Host7-191 may be shown in red to alert a user that these host servers are being underlisted. The information for host servers that are being highly utilized, such as Host1-189 and Host8-200, may be shown in green, while the information for the host servers that are being moderately utilized, such as Host2-135, Host 5-287, and Host 9-301, may be shown in yellow.

Though FIGS. 4 and 5 depict energy consumption and energy costs in terms of power consumption, it should be appreciated that similar graphs and tables may show energy consumed and energy cost data for cooling.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method comprising:

collecting, via respective agents running on respective host servers in a cloud computing environment, respective energy consumption data representing energy consumed by respective hardware in the respective host servers over a time period, wherein the respective agents communicate with the respective hardware on each of the respective host servers using a unified application programming interface (API) residing in each of the respective host servers;

determining, by a data analyzer in communication with a host server manager that manages the respective agents, respective calculated energy costs that have been incurred over the time period for the respective host servers based on the respective energy consumption data of the respective hardware monitored over the time period;

identifying, by the data analyzer, a subset of the respective host servers that are being underutilized based on the respective energy consumption data of the respective hardware monitored over the time period and the respective calculated energy costs;

calculating, by the data analyzer, future energy consumption and future energy costs for each of the respective host servers based on an action to take with respect to the identified subset of the respective host servers, wherein the action to take is at least one of (i) migrating a workload of at least one of the subset of respective host servers that are being underutilized to one or more of the respective host servers that are not underutilized;

(ii) temporarily putting at least one of the subset of respective host servers that are being underutilized into a power saving mode for a period of time;

(iii) permanently turning off at least one of the subset of respective host servers that are being underutilized; or (iv) temporarily putting at least one of the subset of respective host servers that are being underutilized into a hibernation or sleep mode for a period of time;

forecasting, by the data analyzer, the calculated future energy consumption and the calculated future energy costs for each of the respective host servers;

determining, by the data analyzer, the action to take with respect to the subset of the respective host servers that are being underutilized based on the calculated future energy consumption and the calculated future energy costs for each of the respective host servers; and initiating, by the host server manager, the determined action.

2. The method of claim 1, further comprising:
presenting a description of the determined action to a user; and
initiating the determined action responsive to input from the user.

3. The method of claim 1, further comprising presenting an alert identifying the subset of the respective host servers that are being underutilized.

4. The method of claim 1, wherein the respective energy consumption data includes power consumption data representing power consumed by the hardware of the respective host servers.

5. The method of claim 1, wherein the respective energy consumption data includes cooling consumption data representing energy consumed in cooling the respective host servers.

6. The method of claim 1, further comprising presenting the respective energy consumption data and respective energy cost data representing the respective calculated energy costs for display.

7. The method of claim 1, further comprising forecasting future energy consumption and future energy costs based on the respective energy consumption data and respective energy costs.

8. The method of claim 1, wherein the unified API allows communication between the respective agents and the respective hardware across a plurality of manufacturers of the host servers.

9. A data analyzer, comprising:
a processor; and
a memory having instructions stored thereon which, when executed by the processor, cause the processor to:
collect, via respective agents running on respective host servers in a cloud computing environment, respective energy consumption data representing energy consumed by respective hardware in the respective host servers over a time period, wherein the respective agents communicate with the respective hardware on each of the respective host servers using a unified application programming interface (API) residing in each of the respective host servers;
determine respective calculated energy costs that have been incurred over the time period for the respective host servers based on the respective energy consumption data of the respective hardware monitored over the time period;
identify a subset of the respective host servers that are being underutilized based on the respective energy consumption data and the respective calculated energy costs of the respective hardware monitored over the time period;
calculate future energy consumption and future energy costs for each of the respective host servers based on an action to take with respect to the identified subset of the respective host servers, wherein the action that the data analyzer determines to take is at least one of:
(i) migrating a workload of at least one of the subset of respective host servers that are being underutilized to one or more of the respective host servers that are not underutilized;
(ii) temporarily putting at least one of the subset of respective host servers that are being underutilized into a power saving mode for a period of time;
(iii) permanently turning off at least one of the subset of respective host servers that are being underutilized; or
(iv) temporarily putting at least one of the subset of respective host servers that are being underutilized into a hibernation or sleep mode for a period of time;
forecast the calculated future energy consumption and the calculated future energy costs for each of the respective host servers;
determine the action to take with respect to the subset of the respective host servers that are being underutilized based on the calculated future energy consumption and calculated future energy costs for each of the respective host servers; and
initial, by a host server manager, the determined action;
wherein the respective agents are managed by the host server manager that is in communication with the data analyzer.

10. The data analyzer of claim 9, further comprising an interface, wherein the instructions, when executed by the processor, cause the processor to present a description of the action to a user via the interface.

11. The data analyzer of claim 10, wherein the instructions, when executed by the processor, further cause the processor to initiate the determined action responsive to user input.

12. The data analyzer of claim 9, wherein the respective energy consumption data includes power consumption data representing power consumed by the hardware of the respective host servers.

13. The data analyzer of claim 9, wherein the respective energy consumption data includes cooling consumption data representing energy consumed in cooling the respective host servers.

14. The data analyzer of claim 9, further comprising an interface, wherein the instructions, when executed by the processor, further cause the processor to present for display the respective energy consumption data and respective energy cost data representing the respective calculated energy costs.

15. The data analyzer of claim 9, wherein the instructions, when executed by the processor, further cause the processor to forecast future energy consumption for each of the respective host servers based on the respective energy consumption data and the respective calculated energy costs.

16. A non-transitory computer readable medium comprising computer executable instructions stored thereon that, when executed by a processor, cause the processor to:
collect, via respective agents running on respective host servers in a cloud computing environment, respective energy consumption data representing energy consumed by respective hardware in the respective host servers over repeating time periods, wherein the respective agents communicate with the respective hardware on each of the respective host servers using a unified application programming interface (API) residing in each of the respective host servers; and for each time period:
determine, via a data analyzer in communication with a host server manager that manages the respective agents, respective calculated energy costs that have been incurred for the respective host servers based on the respective energy consumption data of the respective hardware monitored over the time period;
identify, via the data analyzer, a subset of the respective host servers that are being underutilized based on the respective energy consumption data of the respective hardware monitored over the time period and the respective calculated energy costs;

calculate, by the data analyzer, future energy consumption and future energy costs for each of the respective host servers based on an action to take with respect to the identified subset of the respective host servers, wherein the action to take is at least one of:

(i) migrating a workload of at least one of the subset of respective host servers that are being underutilized to one or more of the respective host servers that are not underutilized;

(ii) temporarily putting at least one of the subset of respective host servers that are being underutilized into a power saving mode for a period of time;

(iii) permanently turning off at least one of the subset of respective host servers that are being underutilized; or (iv) temporarily putting at least one of the subset of respective host servers that are being underutilized into a hibernation or sleep mode for a period of time;

forecast, by the data analyzer, the calculated future energy consumption and the calculated future energy costs for each of the respective host servers;

determine, by the data analyzer, the action to take with respect to the subset of the respective host servers that are being underutilized based on the calculated future energy consumption and calculated future energy costs for each of the respective host servers; and initial, by the host server manager, the determined action.

17. The non-transitory computer readable medium of claim 16, wherein the instructions, when executed by the processor, further cause the processor to initiate the determined action responsive to user input.

18. The non-transitory computer readable medium of claim 16, wherein the respective energy consumption data includes power consumption data representing power consumed by the hardware of the respective host servers.

19. The non-transitory computer readable medium of claim 16, wherein the respective energy consumption data includes cooling consumption data representing energy consumed in cooling each of the respective host servers.

20. The non-transitory computer readable medium of claim 16, wherein the instructions, when executed by the processor, further cause the processor to forecast future energy consumption of the respective host servers based on the respective energy consumption data.

* * * * *